(12) United States Patent
Vincent et al.

(10) Patent No.: US 9,781,776 B2
(45) Date of Patent: Oct. 3, 2017

(54) MOLTEN METAL HANDLING DEVICE HEATING SYSTEM (71) Applicants: Mark Vincent, Bedfordshire (GB); Mark Palmer, Spokane, WA (US)

(72) Inventors: Mark Vincent, Bedfordshire (GB); Mark Palmer, Spokane, WA (US)

(73) Assignee: Pyrotek, Incorporated, Spokane, WA (US)

( * ) Notice: Subject to any disclaimer, the term of this patent is extended or adjusted under 35 U.S.C. 154(b) by 94 days.

(21) Appl. No.: 14/739,783

(22) Filed: Jun. 15, 2015

(65) Prior Publication Data

US 2016/0366727 A1    Dec. 15, 2016

(51) Int. Cl.
| | |
|---|---|
| *H05B 6/20* | (2006.01) |
| *H05B 6/36* | (2006.01) |
| *C21D 1/10* | (2006.01) |
| *H05B 6/18* | (2006.01) |
| *B22D 35/04* | (2006.01) |

(52) U.S. Cl.
CPC ............. *H05B 6/367* (2013.01); *B22D 35/04* (2013.01); *C21D 1/10* (2013.01); *H05B 6/18* (2013.01)

(58) Field of Classification Search
CPC ........................................................ F27D 3/145
USPC ............................................................ 266/275
See application file for complete search history.

(56) References Cited

U.S. PATENT DOCUMENTS

| | | | |
|---|---|---|---|
| 3,677,682 A * | 7/1972 | Putkowski | .......... B29C 45/2725 |
| | | | 425/192 R |
| 3,751,571 A | 8/1973 | Burrows | |
| 4,345,743 A | 8/1982 | Sivilotti et al. | |
| 6,444,165 B1 | 9/2002 | Eckert | |
| 6,973,955 B2 | 12/2005 | Tingey et al. | |
| 9,095,896 B2 | 8/2015 | Vincent | |
| 2011/0180173 A1* | 7/2011 | Spies | ........................ C21B 7/12 |
| | | | 138/111 |

FOREIGN PATENT DOCUMENTS

GB         2492106 A  * 12/2012   ............. B22D 35/04

* cited by examiner

*Primary Examiner* — Scott Kastler
(74) *Attorney, Agent, or Firm* — Wells St. John, P.S.

(57) ABSTRACT

Disclosed is a heating system for molten metal handling devices, examples of which are troughs, launders and other vessels. The heating system may include a refractory containment body, heater assembly, a containment shell and a thermal inducing interface between the heater assemblies and the containment shell and/or refractory body.

19 Claims, 12 Drawing Sheets

MOLTEN METAL HANDLING DEVICE HEATING SYSTEM

CROSS REFERENCE TO RELATED APPLICATION

This application does not claim the benefit of any other patent application.

TECHNICAL FIELD

This invention pertains to a heating and insulation system for molten metal handling devices, examples of which are troughs, launders and other vessels.

BACKGROUND OF THE INVENTION

During processing and transfer, molten metal such as aluminum, aluminum alloys and others are typically handled and/or contained in various devices, vessels, troughs, launders and other containment and movement/transfer devices. Molten metal troughs for example are commonly used to transfer and contain molten metal.

While the molten metal contains a significant amount of internal heat, in many applications it is desirable and/or necessary to provide additional or supplemental heat to the molten metal in the handling devices in order to maintain the desired temperature of the molten metal and/or reduce the temperature differential from the center of the molten metal to the molten metal interface within the handling device. Supplemental or additional heat can supply heat to and through the refractory of the handling or containment device, and to the molten metal itself.

In some applications if the addition of the heat to the molten metal is not sufficiently controlled, the industry has experienced hot spots on the interior surface of the metal handling device (such as a trough) which can cause undesirable issues in the molten metal and on the interior surface of the refractory of the handling device. The balancing interest and concern is that the more the heat supply is reduced or buffered to avoid creating hot spots, generally the less energy efficient the process is.

Past attempts to address this situation have included creating continuous air gaps between the heater element and the refractory body of the handling device; using an expensive higher grade of material that makes the product potentially cost prohibitive; and others.

It is also desirable in some embodiments of this invention to maximize the conduction of heat, versus convection, radiation and/or emissive heat transfer across air or other gaps, which tends to increase the energy efficiency when a conductive or highly conductive material is used for said conduction. In some cases it is the configuration of the components of the system that results in said efficiencies, and in others the mechanical application of forces may be imparted to the various components to minimize the formation of gaps due to dissimilar expansion and contraction of adjacent materials, i.e. to squeeze or keep them squeezed together.

It is an object of some embodiments of this invention to provide a molten metal handling, containment and/or heating device that efficiently and effectively distributes the heat supplied to the molten metal while avoiding the creation of hot spots and other related issues.

It is a further objective of some embodiments of this invention to provide such a molten metal handling and heating device that provides sufficient desired heat through the bottom and/or side walls of the refractory body that a top to the device is not required.

It is also an objective of some embodiments of this invention to maximize the thermal or heat transfer by conduction or conductive heat transfer.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
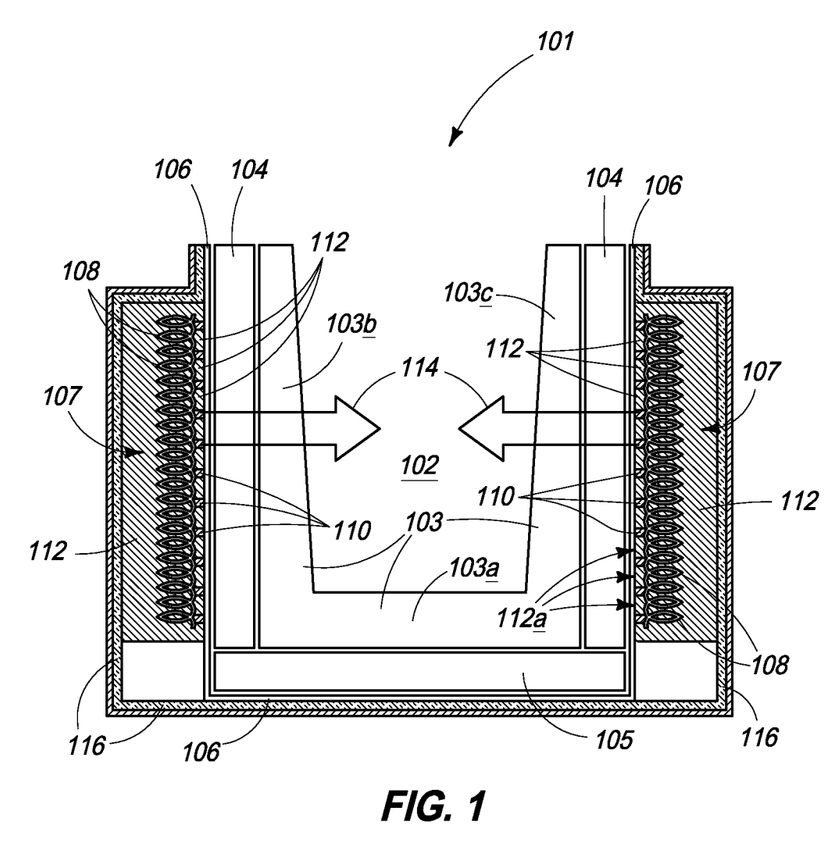
FIG. 1 is a cross-section view of one example of an embodiment of this invention.

FIG. 1 is a cross-section view of one example of an embodiment of a handling device heating system contemplated by this invention, illustrating outer casing 116, containment shell 106, heater elements or heater assemblies 107 with heater coils 108 contained therein, and refractory trough body 103 with trough body bottom wall 103a, first side wall 103b and second side wall 103c of trough body 103. The trough walls define trough 102. FIG. 1 further shows the containment shell 106, insulation layers 104 and bottom liner 105. FIG. 1 illustrates heat 114 being provided to the refractory trough 102 area, which is where the molten metal would receive the heat.

In FIG. 1, the heater elements or heater assemblies 107 include heater coils 108 within heater assembly bodies 112. FIG. 1 shows how the heating elements in this embodiment may include inward faces of the heating elements 107 which have horizontal grooves therein. In the embodiment illustrated in FIG. 1, the high temperature heat inducing cement 110 is utilized to fill those grooves between the protruding portions of the heating element bodies to assure the heat transfer is more efficiently provided via conduction without gaps through both the heating element body portions 112 and through the high temperature heat inducing cement 110 placed between the inner facing surfaces 112a of the heating element body portions 112. In embodiments in which there are such grooves in the surfaces or interfaces of the heating elements (such as shown in FIG. 1), the high temperature heat inducing cement may be used to fill those gaps to provide the face, interface or inner surface desired in that embodiment.

Heater assemblies for some applications may include vertical grooves (shown in later figures) which may similarly be filled, within the contemplation of this invention. In still other embodiments, the heater elements may be provided with smooth or flat faces, interfaces or inner surfaces, in which case a layer of the high temperature heat inducing cement may be placed between the heating elements and the containment fence, refractory or other next layer in that particular embodiment of the system, all within the contemplation of this invention.

The containment shell 106 may be comprised of a reinforced fiberglass material ("RFM") such as a low thermally conductive composite material made of fiberglass fabric embedded in a slurry of silicon carbide manufactured by Pyrotek, Inc., Spokane, Wash. under its RFM brand. The thermal expansion coefficient for example for the Pyrotek-manufactured RFM silicon carbide may be about $4.6 \times 10^4$ mm/mm-° C. In other embodiments the containment shell 106 or fence may be made of steel alloys or stainless steel, within the contemplation of embodiments of this invention. While a containment shell 106 is preferable to act as a fence or perimeter barrier to provide some containment in the event molten metal escapes through the refractory, it is not required by all embodiments of this invention.

In the case of the use of steel alloys or stainless steel, the refractory body and/or the interface surface of the one or more heater assemblies tend to separate due to differences in the thermal expansion of the respective materials. It has been found as part of some embodiments of this invention that if the thermal expansion properties of the containment shell are correlated to the thermal expansion properties of one of or both of the refractory body or the one or more heater assemblies, the separation of the containment fence from one of or both of the refractory body or the one or more heater assemblies is reduced. The correlation of the thermal expansion properties will reduce separation during thermal expansion and contraction. This has been experienced in the use of reinforced fiberglass material ("RFM") as described herein. When the term fiberglass is used herein, it may include without limitation, traditional fiberglass matting, or is may preferably include a high temperature leached glass in the form of a flat woven mat that has apertures. The apertures in the flat woven mat may be of any geometry, such as square, round, polygonal, or other. In other embodiments an "E" glass grade of cloth may be utilized.

The additional barriers or layers 104 may be any one or more of a number of different materials depending on the embodiment and application, such as the embodiment illustrated in FIG. 1 utilizing an approximate seventy-four percent silicon carbide material, in combination with an approximate thirty-five percent silicon carbide refractory material castable comprising the refractory trough 103. The bottom layer or liner 105 may be any one or more different materials, such as a ceramic paper based liner, micro-pore board or others, with no one in particular being required to practice this invention.

The refractory body 103 shown in FIG. 1 in combination with the insulation layers 104 may be constructed of any one or more of a number of different materials, such as Pyrocast 220HT refractory castable available from Pyrotek, Inc., Spokane, Wash. The Pyrocast 220HT is a high performance refractory castable based on fused silica and silicon carbide (in an approximate percentage of 35%), and a thermal conductivity of: about 0.79 W/(m-K)[5.5 Btu-in/ft$^2$/hr ° F.] at 752° F., 1.08 W/(m-K)[7.5 Btu-in/ft$^2$/hr ° F.] at 1022° F. and 1.45 W/(m-K)[10 Btu-in/ft$^2$/hr ° F.] at 1292° F.

The heater assemblies 107 may for example be ceramic heating panels as made by Sandvik Heating Technology UK, which may be made of Sandvik's Fibrothal material.

The high temperature thermal inducing ceramic cement (item 110 in FIG. 1 and item 144 in FIG. 2), may for example be obtained from Sauereisen Company of Pittsburgh, Pa. as its Electrotemp Cement No. 8 (which provides a high temperature cement which is heat conductive— thermal conductivity of 6.7 to 8.3 Btu-in/ft$^2$/hr ° F.).

It should be noted that this invention is not limited to one particular type or composition of thermal inducing cement, but instead may use any one of a number of different types, including without limitation those based with aluminum silicate, phosphate, and others, all within the contemplation of this invention.

By utilizing the combination of the heating elements with the high temperature thermal inducing cement between the heating elements and the refractory trough, the heat transfer of the system has achieved a higher or improved energy efficiency. Furthermore by utilizing the high temperature thermal inducing cement for example, the thermal expansion and/or contraction characteristics are more compatible with the refractory, resulting in a more consistent conductive interface and improved operating efficiencies in providing heat to the molten metal.

Figure 2:
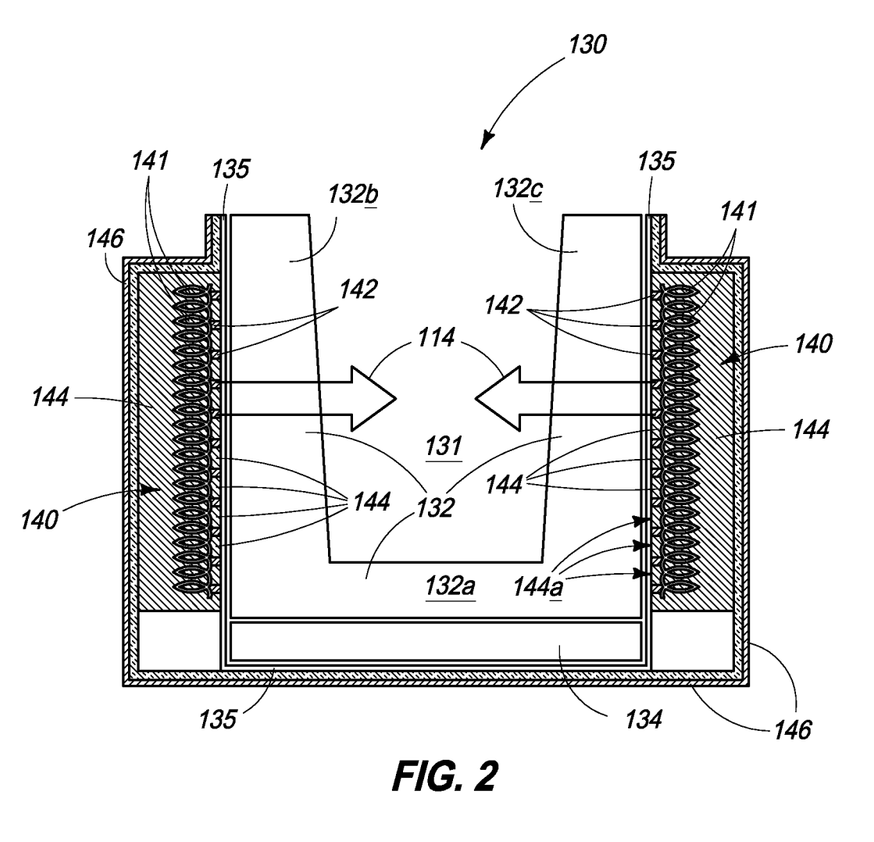
FIG. 2 is a cross-section view of another example of an embodiment of this invention.

FIG. 2 is a cross-section view of another example of an embodiment of this invention 130, showing outer casing 146, refractory trough body 132 with trough bottom 132a, first side wall 132b and second side wall 132c of trough body 132. FIG. 2 shows heating elements or assemblies 140 with heating coils 141 contained within heater assembly bodies 144, inner facing surfaces 144a of the heater assembly bodies 144, all within outer casing 146.

FIG. 2 illustrates an embodiment of the invention wherein a layer of the high temperature thermal inducing cement 142 is provided in what would otherwise be grooves between the heater assembly bodies 144. The addition of the high temperature thermal inducing cement 142 assists in maintaining the contact with the containment shell 135 or fence in this embodiment, and provides a material of a higher thermal conductivity to provide a heat or energy pathway from the heater coils 141 toward the refractory trough 132. The configuration illustrated in this embodiment provides spacing (via heater assembly body portions 144) between the heater coils 141 in the heater assembly 140 and any adjacent or abutting component such as the containment shell 135.

The unique configuration in FIG. 2 may utilize a high wear impact refractory castable material such as the Pyrocast SCM-2600, manufactured by Pyrotek, Inc., Spokane, Wash. The Pyrocast SCM-2600 has a high thermal conductivity of: about 6.6 W/(m-K)[45.8 Btu-in/ft$^2$/hr ° F.] at 1000° F., 7.19 W/(m-K)[49.9 Btu-in/ft$^2$/hr ° F.] at 1500° F. and 7.8 W/(m-K) [54.1 Btu-in/ft$^2$/hr ° F.] at 2000° F. The Pyrocast SCM-2600 generally has a silicon carbide (SiC) composition in the seventy-four percent (74%) or higher (76.7%) silicon carbide (SiC) content.

FIG. 2 further illustrates bottom liner 134 and containment shell 135, which may also be comprised of a reinforced fiberglass material ("RFM") such as a low thermally conductive composite material made of fiberglass fabric embedded in a slurry of silicon carbide manufactured by Pyrotek, Inc., Spokane, Wash. under its RFM brand.

Figure 4B:
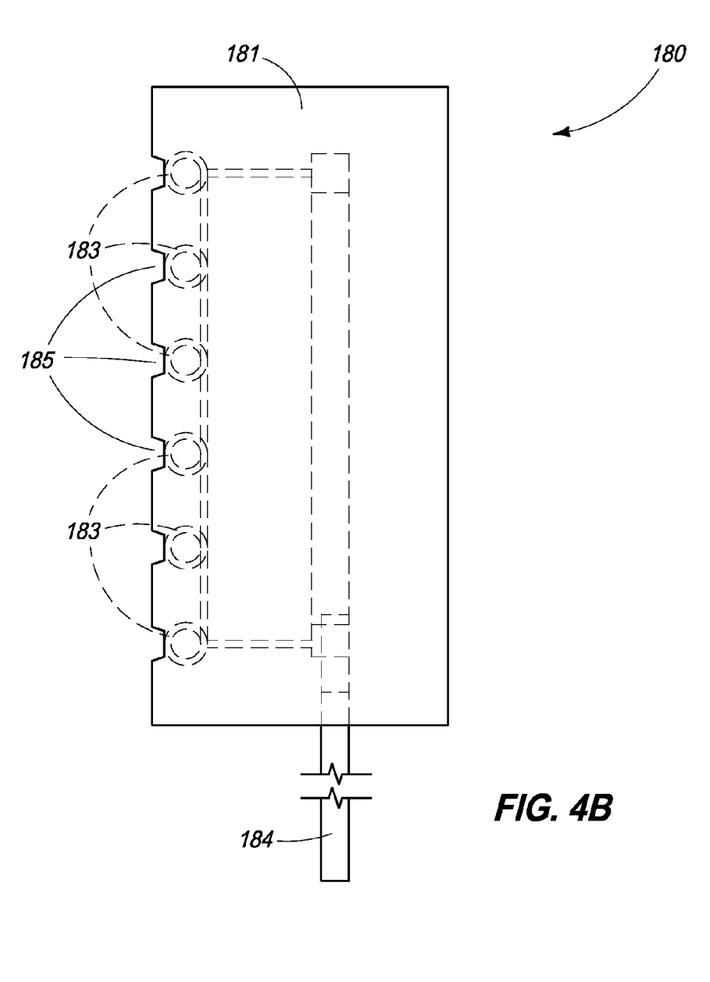
FIG. 4B is a side view of the example of a heater assembly illustrated in FIG. 4A, which may be utilized in some embodiments of this invention.
Figure 5:
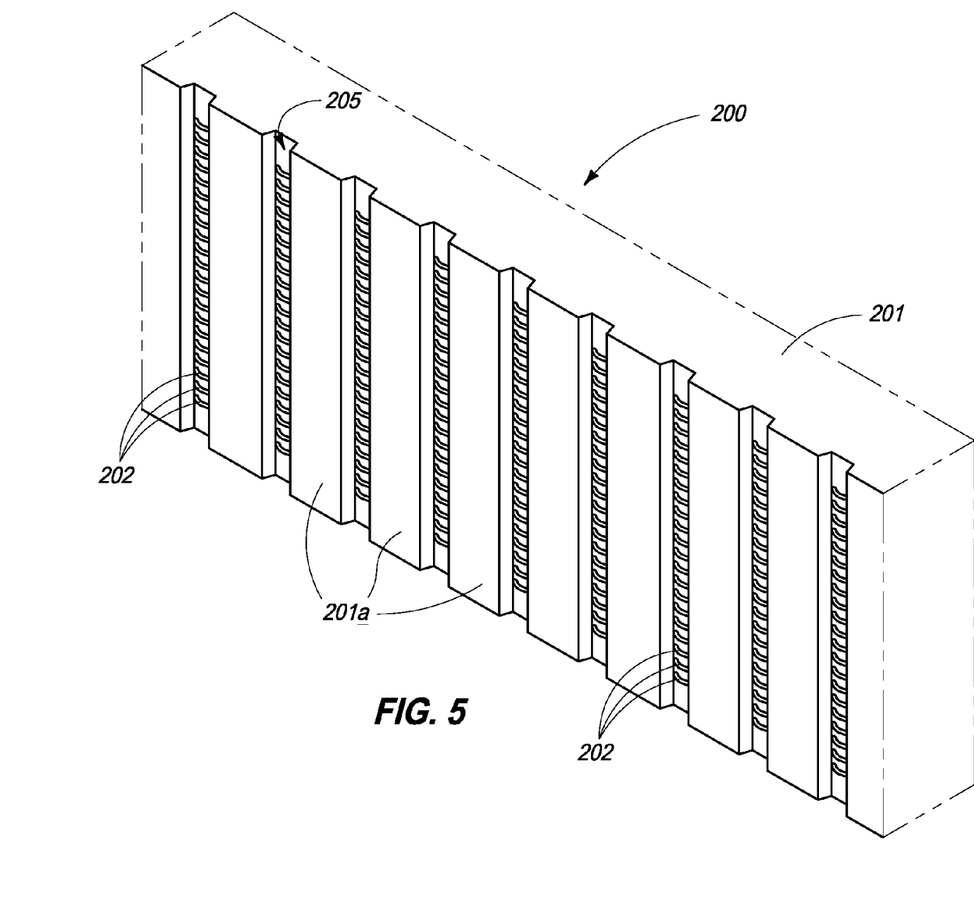
FIG. 5 is a perspective view of the example of a heater assembly which may be utilized in some embodiments of this invention.

While FIG. 1 illustrates how existing heating elements may be utilized in combination with the grooves in the heater element bodies 112 being filled with high temperature thermal inducing cement 110, FIG. 2 illustrates heater assembly body 140 with no grooves but instead with a continuous layer of the high temperature thermal inducing cement 142 at, near or adjacent to the heater elements or heater coils 141. FIGS. 4B and 5 illustrate examples of how the inward facing surfaces of the heater assemblies may be intermittent, or not have a fully continuous surface.

Figure 3:
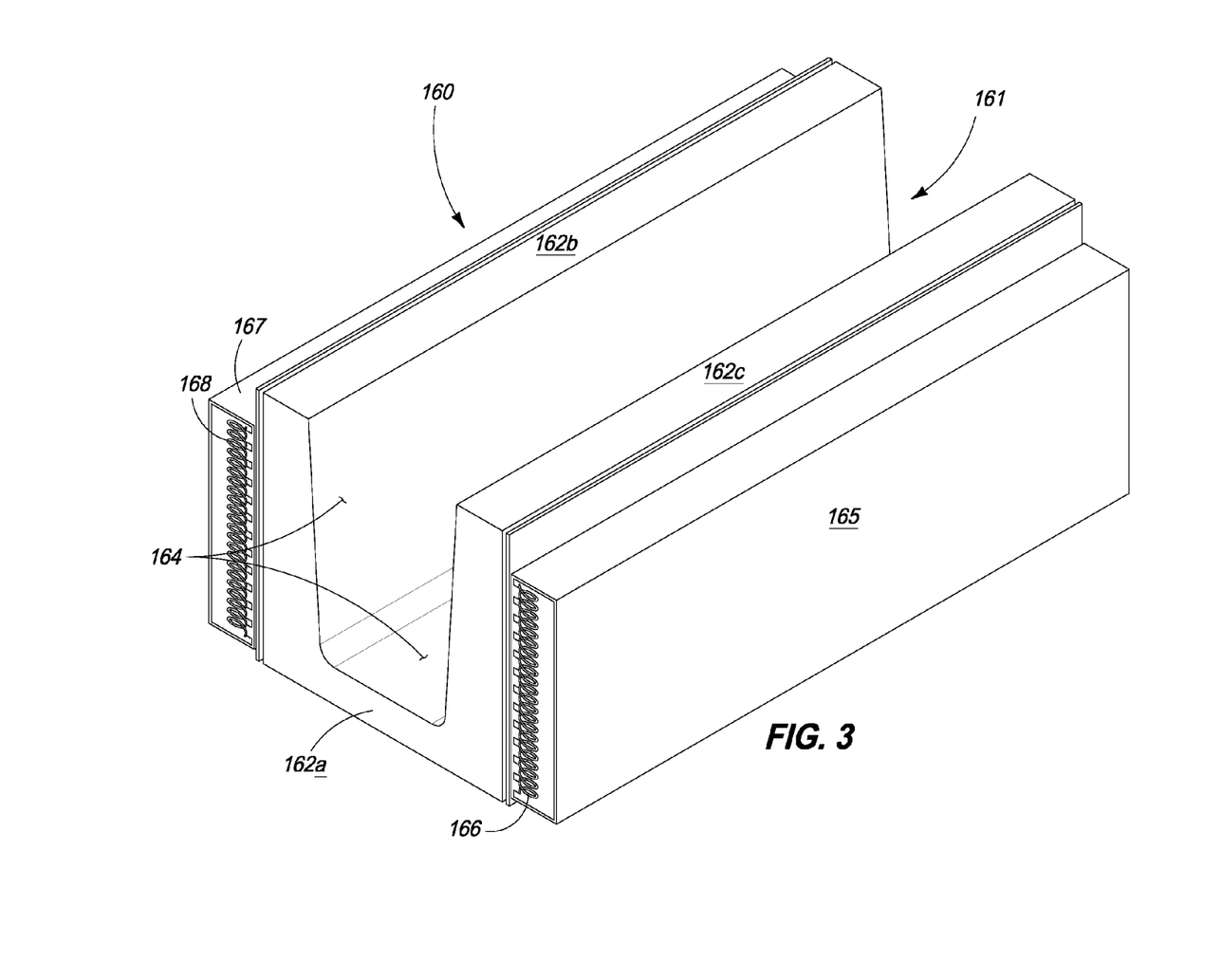
FIG. 3 is a perspective view of a molten metal handling device, a launder or trough with an example of an embodiment of a heating system used in connection therewith.

FIG. 3 is a perspective view of a molten metal handling device 160, which in the application shown is a launder or trough 160 with an example of an embodiment of a heating system used in connection therewith. FIG. 3 illustrates refractory trough 160 with trough interior side walls 162b and 162c, trough bottom wall 162a, trough internal surface 164, trough interior 161, heating element 165 with heater coils 166 and heating element 167 with heater coils 168.

Figure 4A:
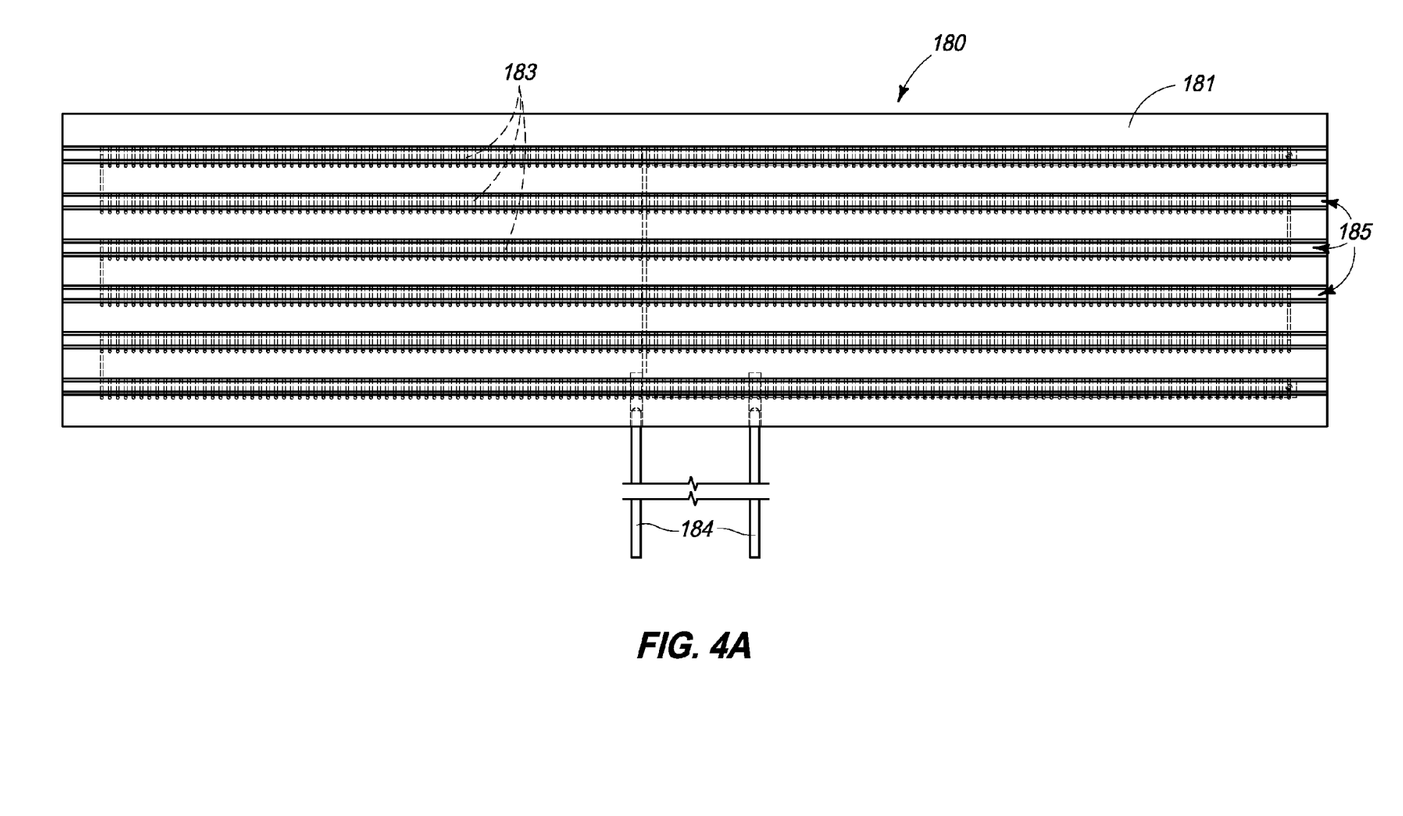
FIG. 4A is an elevation view of an example of a heater assembly which may be utilized in some embodiments of this invention.

FIG. 4A is an elevation view of an example of the heater assembly 180 which may be utilized in some embodiments of this invention. FIG. 4A illustrates a front view of insulation body 181, heater coils or elements 183 of the heater assembly 180, as well as electrical connectors 184 for providing the heater elements the desired electrical power. The grooves 185 on the face of the heater element 180 are horizontal in the embodiment shown. One such source includes a unit utilizing Fibrothal as manufactured by Sandvik Heating Technology UK FIG. 4B is a side view of the example of a heater assembly 180 illustrated in FIG. 4A, which may be utilized in some embodiments of this invention. FIG. 4B illustrates heater elements or heater coils 183, electrical connectors 184, heating element body 181 and examples of grooves 185 in the heater body 181.

FIG. 5 is a perspective view of another example of a heater assembly 200 which may be utilized in some embodiments of this invention. FIG. 5 illustrates how a heating element 200 may include heater coils or elements 202 embedded within a heating element body 201, with vertical columns 201a protruding outwardly from the heating element body. Between the respective columns 201a are vertical channels or grooves 205 which expose the heater coils or elements 202 and provide an area for the addition of other desirable materials, such as a high temperature thermal inducing cement (shown and discussed in later Figures).

Figure 6:
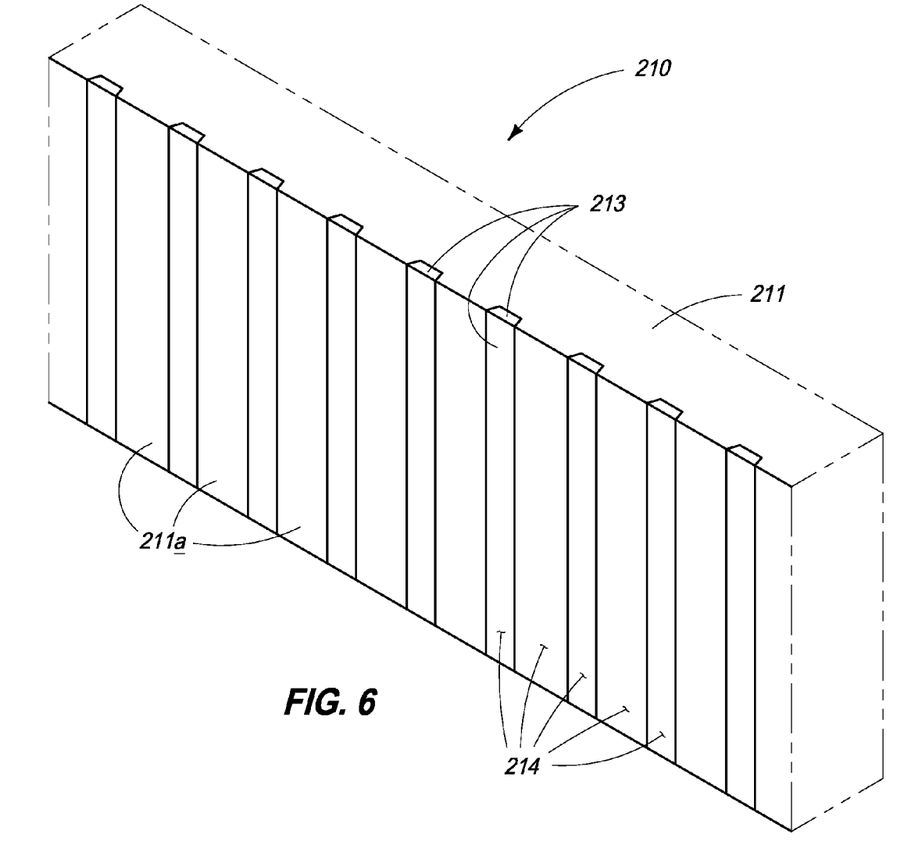
FIG. 6 is a perspective view of an example of a heater assembly which may be utilized in some embodiments of this invention.

FIG. 6 is a perspective view of an example of a heater assembly 210 which may be utilized in some embodiments of this invention. FIG. 6 illustrates a heater body 211, the high temperature thermal inducing cement 213 filling what were recesses or grooves in the heater assembly body 211. The heater body 211 has interior facing surfaces 211a which would combine with the thermal inducing cement 213 to form an interface surface 214 that would then typically be abutted against a refractory body or a containment shell if a layer of thermal inducing cement is not placed between that interface surface 214 and either the refractory body or the containment shell. The columns 211a are the same or similar material as the rest of the heater body 211, whereas the material within the grooves or slots is of a different material, such as a high temperature thermal inducing grout-like material or cement 213.

FIG. 6 therefore results in a surface or interface of the heating element which may include alternate columns of dissimilar material through which the heat is transmitted. For example the high temperature heat inducing cement 213 would have one thermal conductivity and set of properties, whereas the heating element body columns 211a would have a set of properties dissimilar to that of the high temperature heat inducing cement 213. This has the effect of creating an alternating or distributed heat transfer distribution (by conduction) different than if the front surface of the heating element 210 were a continuous flat surface of the same material.

Figure 7:
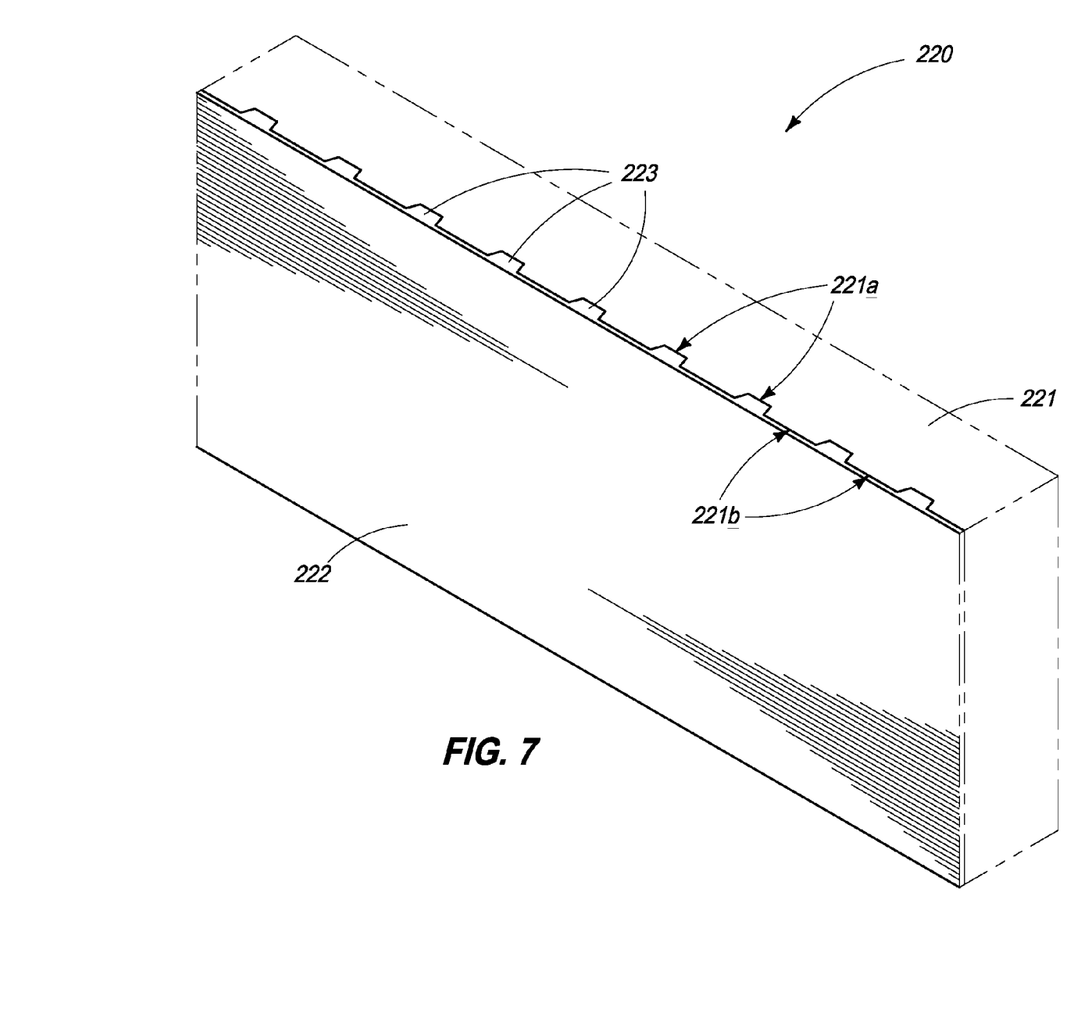
FIG. 7 is a perspective view of an example of a heater assembly which may be utilized in some embodiments of this invention.

FIG. 7 is a perspective view of an example of a heating element 220 which may be utilized in some embodiments of this invention. FIG. 7 illustrates heating element body 221 with vertical grooves 221a and inward facing surfaces 221b of the heater assembly body, high temperature heat inducing cement 223 filling the grooves 221a and an additional layer of the high temperature heat inducing cement 222 covering the inward facing surfaces 221b and the inward facing surface of the high temperature thermal inducing cement 223.

Figure 8:
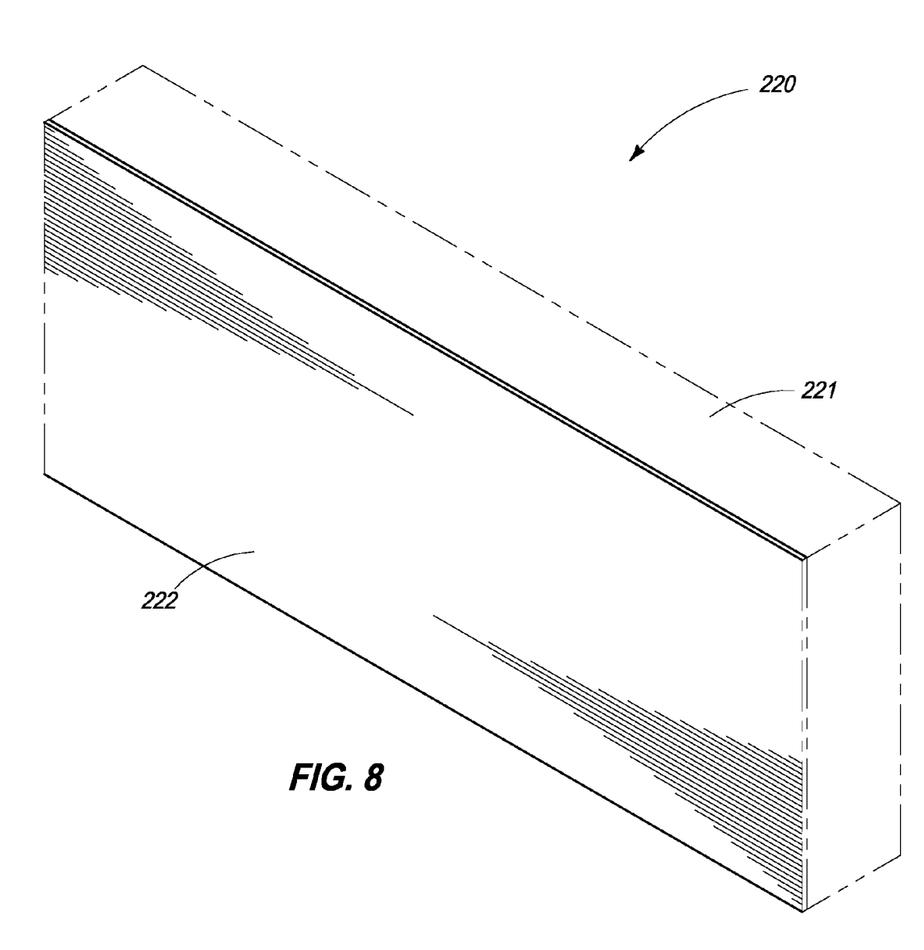
FIG. 8 is a perspective view of an example of another heater assembly which may be utilized in some embodiments of this invention.

FIG. 8 is a perspective view of an alternate configuration of the example of the heater assembly 220 illustrated in FIG. 7, and which may be utilized in some embodiments of this invention. FIG. 8 illustrates heating element body 221 without any vertical grooves or columns therein, but with an additional layer of the high temperature heat inducing cement 222 covering the surface or interface of the heating elements.

Figure 9:
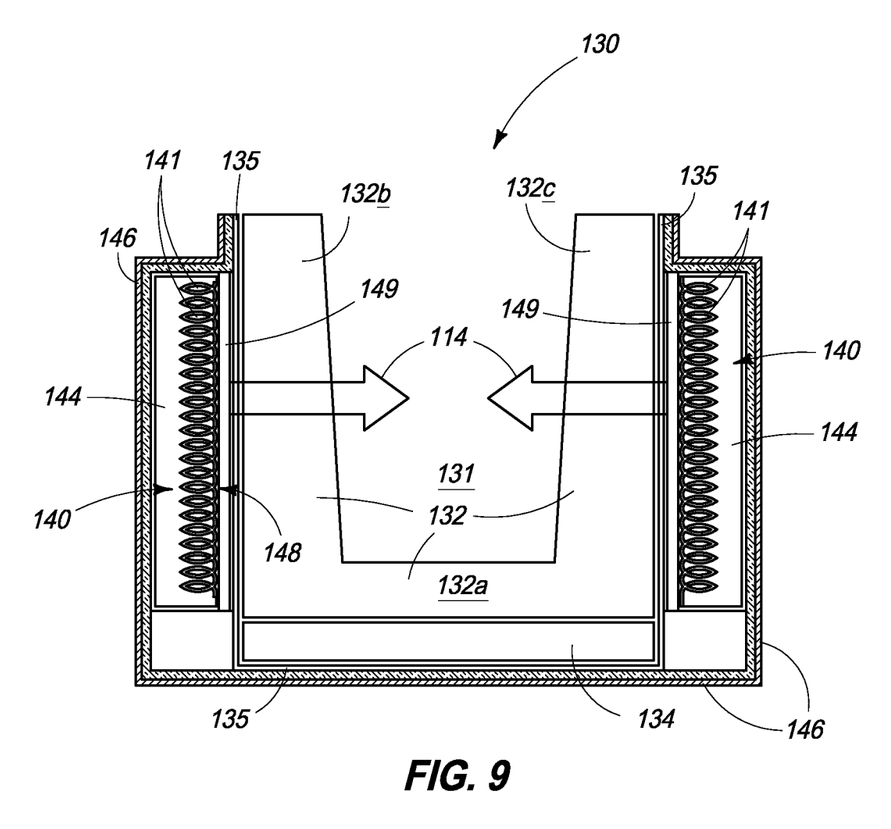
FIG. 9 is a cross-section view of another example of an embodiment of this invention similar to that in FIG. 2 only with a relatively flat surface on the heater assembly.

FIG. 9 is a cross-section view of another example of an embodiment of this invention 130, showing refractory trough body 132 with trough bottom 132a, first side wall 132b and second side wall 132c of trough body 132. FIG. 8 shows heating elements or heater assemblies 140 with heating coils 141 contained within heating element bodies 144.

FIG. 9 illustrates an embodiment of the invention similar to FIG. 2, only wherein a layer of the high temperature inducing cement 149 is provided between a relatively flat or smooth surface of the heater assembly 140 and the castable refractory body 132. Like numbered items are the same as in FIG. 2 and will not be repeated here. FIG. 9 therefore illustrates a configuration of one embodiment of this invention wherein the interface surface 148 of the heater assembly abuts a layer of high temperature (and high thermal conductivity) thermal inducing layer 149 (which may be a high temperature thermal inducing cement as described elsewhere herein or it may be some other abutting thermal inducing layer). While FIGS. 1 & 2 illustrate how existing heating elements may be utilized in combination with the grooves in the heater element bodies 112 being filled with high temperature thermal inducing cement 110, FIG. 9 illustrates heater assemblies 140 without grooves (as shown for example in FIG. 4B) but instead with a continuous layer of the high temperature thermal inducing cement 149 at, near or adjacent to the heater elements 141. In this case the later of the high temperature thermal inducing cement 149 allows heater coils 141 to be placed at or near the inner facing surface 148 of the heater assemblies 140.

In typical heater assemblies available for this type of application, the heater coils are set back or spaced apart from the surface of the heater assembly that for instance abuts or interfaces with the containment shell or fence, or that abuts or interfaces with the refractory body. The columns on the heater panel assembly that would typically interface (such as columns 201a in FIG. 5) would generally have a lower thermal conductivity. The high temperature thermal inducing cement that may be added in embodiments of this invention may have a higher thermal conductivity, which improves the efficiency of the heating system in embodiments of this invention. This type of configuration would have improved system energy performance while maintaining the spacing of the heater coils within the heater assembly and the interface. However in other embodiments of this invention such as shown in FIG. 9 wherein the spacing between the heater coils and the outer surface or interface of the heater assembly is eliminated, the layer of high temperature thermal inducing cement transmits the heat more efficiently without creating undesired hot spots and other undesirable results.

Figure 10:
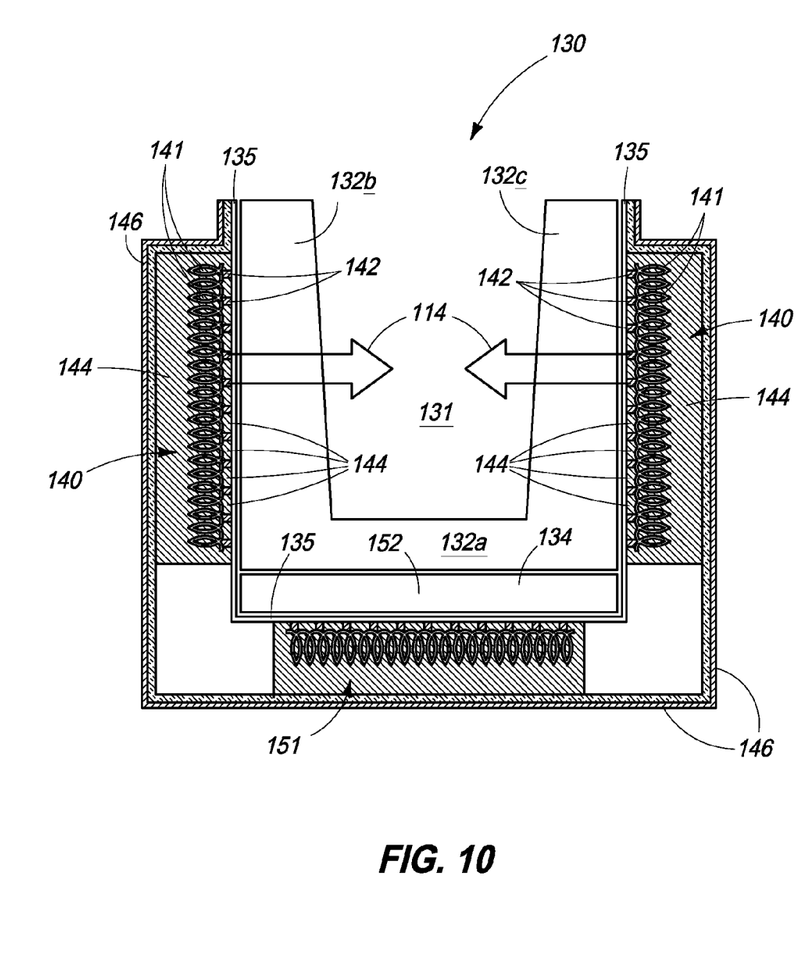
FIG. 10 is a cross-section view of the example of another aspect of the embodiment of this invention shown in FIG. 2, only with a heater added below the trough.

FIG. 10 is a cross-section view of the example of another aspect of the embodiment of this invention shown in FIG. 2, only further including a heater 151 positioned below or as part of the bottom wall (or floor) of the trough. In the aspect of the embodiment in which a heater is utilized below the trough, instead of the layer between the heater and the trough being an insulator (similar to item 134 in FIG. 2, it would instead be a thermally conductive layer 152. It should be noted that if the bottom heater 151 is used, a conductive layer 152 may or may not be utilized depending on the specific application. In the event a conductive layer is not utilized, then it may be preferred to add some additional containment layer or fence for additional protection in the event molten metal escapes through the refractory. Like numbered items from FIG. 2 are also shown and will not be repeated or described again herein.

Figure 11:
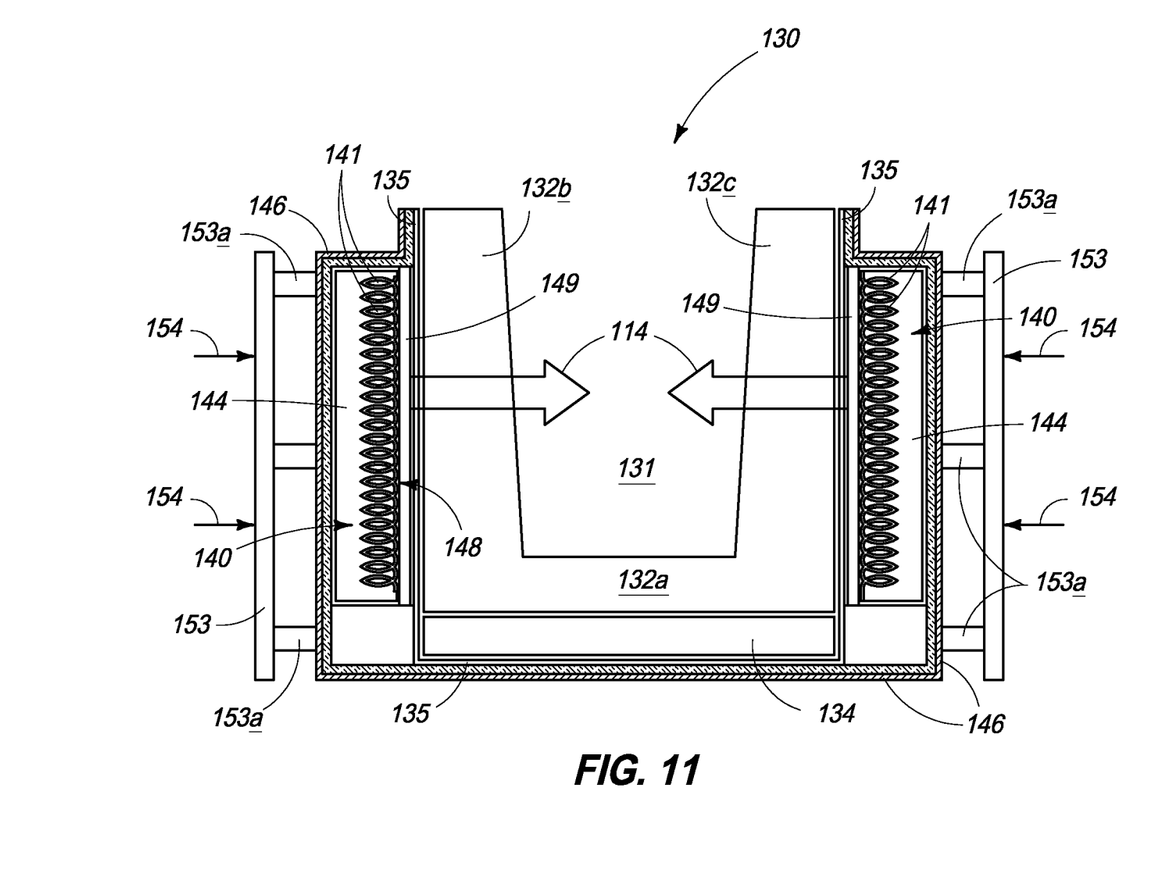
FIG. 11 is a cross-section view of an additional aspect of the example of the embodiment of the invention shown in FIG. 9, only further including a force imparted inwardly on the shell to maintain or improve on the contact and conduction of heat from the heaters through the refractory.

FIG. 11 is a cross-section view of an additional aspect of the example of the embodiment of the invention shown in FIG. 9, only further including a force imparted inwardly on the shell to maintain or improve on the contact and conduction of heat from the heaters through the refractory first side wall 132b and second side wall 132c. In embodiments in which it is desired to maximize the thermal conduction between the heaters 140, through the thermal inducing layer 149 and containment shell 135, it may be desirable to impart a force 154 to maintain solid contact to maximize conduction, especially if any of the materials used may create small gaps due to differences in thermal expansion of materials between the various layers. Any one of a number of known presses or force-inducing devices 153, 153a may be utilized to impart the inward force on the opposing walls of the trough shell, with no one in particular being required to practice the invention. The press may be used from the beginning of the service of the part or it may be implemented in stages throughout the service life to attempt to maintain maximum material continuity to maximize thermal conduction. Like numbered items from FIG. 9 are also shown and will not be repeated or described again herein.

As will be appreciated by those of reasonable skill in the art, there are numerous embodiments to this invention, and variations of elements and components which may be used, all within the scope of this invention. In one embodiment for example a molten metal handling device, comprising: an outer casing with a bottom and two side walls generally defining an inner cavity; one or more heater assemblies within the outer casing, each heater assembly comprising: a heater assembly body with an inward facing surface, the inward facing surface including recesses; heater coils within the heater assembly body spaced apart from the inward facing surface of the heater assembly body; a castable refractory body defining a molten metal carrying cavity with a bottom wall, a first side wall and a second side wall, the castable refractory body abutting the one or more heater assemblies; and wherein thermal inducing cement is disposed within the recesses in the inward facing surface of the heater assembly body, facilitating conductive heat transfer from the heater coils through the thermal inducing cement to the refractory body.

Further and/or additional embodiments to that disclosed in the preceding paragraph may be molten metal handling devices: further wherein the thermal inducing cement has a thermal conductivity different than inward facing surface the one or more heater assembly bodies; further comprising a containment shell between and abutting the one or more heater assemblies and the refractory body; further wherein the containment shell is made of reinforced fiberglass material; further wherein the inward facing surface of the heater assembly body and the thermal inducing cement disposed within the recesses in the inward facing surface of the heater assembly body, combine to facilitate conductive heat transfer from the heater coils to the refractory body; further wherein the thermal expansion properties of the containment shell are correlated to the thermal expansion properties of the inward facing surface of the heater assembly body and the thermal inducing cement disposed within the recesses in the inward facing surface of the heater assembly body, to reduce separation during thermal expansion and contraction; further wherein the thermal expansion properties of the containment shell are correlated to the thermal expansion properties of the inward facing surface of the heater assembly body and the thermal inducing cement disposed within the recesses in the inward facing surface of the heater assembly body, to reduce separation during thermal expansion and contraction; and/or further comprising a press disposed to impart an inward force on the two side walls of the outer casing sufficient to compress the inward facing surface of the heater assembly body toward the refractory body.

Further and/or additional further embodiments or aspects of that disclosed in the second preceding paragraph may include a molten metal handling device: further wherein the combination of the inward facing surface of the heater assembly and the thermal inducing cement disposed within the recesses in the inward facing surface of the heater assembly combine to form a conductive interface surface, with possible further aspects comprised of a layer of thermal inducing cement between the conductive interface surface and the refractory body and in embodiments in which a containment shell is between the refractory body and the heater assemblies, a layer of thermal inducing cement between the containment shell and one or both of the conductive interface surface and/or the refractory body.

In various embodiments of this invention the thermal expansion properties of the containment shell may be correlated to the thermal expansion properties of the layer of thermal inducing cement between the conductive interface surface, the thermal expansion properties of the heater assembly interface and/or the refractory body, within the contemplation of this invention.

In another embodiment of this invention, a molten metal handling device is provided which comprises: an outer casing with a bottom and two side walls generally defining an inner cavity; one or more heater assemblies within the outer casing, each heater assembly including a continuous inward facing surface and heater coils within the heater assembly body and adjacent the inward facing surface; a containment shell with a bottom and two side walls, the containment shell being within and abutting the inward facing surfaces of the one or more heating assemblies; a layer of thermal inducing cement sandwiched between the containment shell and the inward facing surfaces of the one or more heater assemblies; and a castable refractory body defining a molten metal carrying cavity with a bottom wall, a first side wall and a second side wall, the castable refractory body being within and abutting the containment shell.

Additional and/or further embodiments to that disclosed in the preceding paragraph are: further wherein the containment shell is made of reinforced fiberglass material; and/or further wherein the thermal expansion properties of the containment shell are correlated to the thermal expansion properties of the layer of thermal inducing cement between the conductive interface surface and the refractory body to reduce separation during thermal expansion and contraction.

In yet another embodiment, a molten metal handling device is provided which comprises: an outer casing defined by a bottom and two side walls generally defining an inner cavity; a castable refractory body defining a molten metal carrying cavity with a bottom wall, a first side wall and a second side wall; one or more heater assemblies, each heater assembly comprising: a heater assembly body with an interface surface abutting the two side walls of the containment shell, the heater assembly body having a heater assembly thermal expansion coefficient; a containment shell between the refractory body and the one or more heater assemblies, the containment fence having a containment shell thermal expansion coefficient; wherein the heater assembly thermal expansion coefficient is correlated to the containment shell thermal expansion coefficient such that the two are compatible, thereby reducing separation during thermal expansion and contraction.

Additional and/or further embodiments to that described in the preceding paragraph are: further wherein the containment shell is made from reinforced fiberglass material; and/or further wherein the thermal expansion properties of the containment shell are correlated to the thermal expansion properties of the refractory body to reduce separation during thermal expansion and contraction.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A molten metal handling device, comprising:
   an outer casing with a bottom and two side walls generally defining an inner cavity;
   one or more heater assemblies within the outer casing, each heater assembly comprising:
      a heater assembly body with an inward facing surface, the inward facing surface including recesses;
      heater coils within the heater assembly body spaced apart from the inward facing surface of the heater assembly body;
   a castable refractory body defining a molten metal carrying cavity with a bottom wall, a first side wall and a second side wall, the castable refractory body abutting the one or more heater assemblies; and
   wherein thermal inducing cement is disposed within the recesses in the inward facing surface of the heater assembly body, facilitating conductive heat transfer from the heater coils through the thermal inducing cement to the refractory body.

2. A molten metal handling device as recited in claim 1, and further wherein the thermal inducing cement has a thermal conductivity different than the inward facing surface of the one or more heater assembly bodies.

3. A molten metal handling device as recited in claim 1, and further comprising a containment shell between and abutting the one or more heater assemblies and the refractory body.

4. A molten metal handling device as recited in claim 3, and further wherein the containment shell is made of reinforced fiberglass material.

5. A molten metal handling device as recited in claim 1, and further wherein the combination of the inward facing surface of the heater assembly and the thermal inducing cement disposed within the recesses in the inward facing surface of the heater assembly combine to form a conductive interface surface.

6. A molten metal handling device as recited in claim 5, and further comprising an additional layer of thermal inducing cement between the conductive interface surface and the refractory body.

7. A molten metal handling device as recited in claim 6, and further comprising a containment shell between the layer of thermal inducing cement and the refractory body.

8. A molten metal handling device as recited in claim 7, and further wherein the containment shell is made of reinforced fiberglass material.

9. A molten metal handling device as recited in claim 3, and further wherein the thermal expansion properties of the containment shell are approximately the same as the thermal expansion properties of the inward facing surface of the heater assembly body and the thermal inducing cement disposed within the recesses in the inward facing surface of the heater assembly body, to reduce separation during thermal expansion and contraction.

10. A molten metal handling device as recited in claim 6, and further wherein the thermal expansion properties of the containment shell are approximately the same as the thermal expansion properties of the layer of thermal inducing cement between the conductive interface surface and the refractory body.

11. A molten metal handling device as recited in claim 1, and further wherein the inward facing surface of the heater assembly body and the thermal inducing cement disposed within the recesses in the inward facing surface of the heater assembly body, combine to facilitate conductive heat transfer from the heater coils to the refractory body.

12. A molten metal handling device as recited in claim 7, and further wherein the combination of the inward facing surface of the heater assembly body and the thermal inducing cement disposed within the recesses in the inward facing surface of the heater assembly body, along with the layer of thermal inducing cement between the conductive interface surface and the refractory body and the containment shell combine to facilitate conductive heat transfer from the heater coils to the refractory body.

13. A molten metal handling device as recited in claim 1, and further comprising a press disposed to impart an inward force on the two side walls of the outer casing sufficient to compress the inward facing surface of the heater assembly body toward the refractory body.

14. A molten metal handling device, comprising:
an outer casing with a bottom and two side walls generally defining an inner cavity;
one or more heater assemblies within the outer casing, each heater assembly including a continuous inward facing surface and heater coils within the heater assembly body and adjacent the inward facing surface;
a containment shell with a bottom and two side walls, the containment shell being within the inward facing surfaces of the one or more heating assemblies;
a layer of thermal inducing cement sandwiched between the containment shell and the inward facing surfaces of the one or more heater assemblies; and
a castable refractory body defining a molten metal carrying cavity with a bottom wall, a first side wall and a second side wall, the castable refractory body being within and abutting the containment shell.

15. A molten metal handling device as recited in claim 14, and further wherein the containment shell is made of reinforced fiberglass material.

16. A molten metal handling device as recited in claim 14, and further wherein the thermal expansion properties of the containment shell are approximately the same as the thermal expansion properties of the layer of thermal inducing cement between the conductive interface surface and the refractory body to reduce separation during thermal expansion and contraction.

17. A molten metal handling device, comprising:
an outer casing defined by a bottom and two side walls generally defining an inner cavity;
a castable refractory body defining a molten metal carrying cavity with a bottom wall, a first side wall and a second side wall;
one or more heater assemblies, each heater assembly comprising: a heater assembly body with an interface surface abutting the two side walls of the containment shell, the heater assembly body having a heater assembly thermal expansion coefficient;
a containment shell between the refractory body and the one or more heater assemblies, the containment shell having a containment shell thermal expansion coefficient;
wherein the heater assembly thermal expansion coefficient is approximately the same as the containment shell thermal expansion coefficient, thereby reducing separation during thermal expansion and contraction.

18. A molten metal handling device as recited in claim 17, and further wherein the containment shell is made from reinforced fiberglass material.

19. A molten metal handling device as recited in claim 17, and further wherein the thermal expansion properties of the containment shell are approximately the same as the thermal expansion properties of the refractory body to reduce separation during thermal expansion and contraction.

* * * * *